(12) United States Patent
Zhang et al.

(10) Patent No.: US 11,754,757 B2
(45) Date of Patent: Sep. 12, 2023

(54) LIGHT BLOCKING SHEET AND LENS MODULE

(71) Applicant: ZHEJIANG SUNNY OPTICS CO., LTD., Zhejiang (CN)

(72) Inventors: Fang Zhang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 289 days.

(21) Appl. No.: 17/131,805

(22) Filed: Dec. 23, 2020

(65) Prior Publication Data
US 2021/0389511 A1 Dec. 16, 2021

(30) Foreign Application Priority Data
Jun. 15, 2020 (CN) .......................... 202021101464.9

(51) Int. Cl.
*G02B 5/00* (2006.01)

(52) U.S. Cl.
CPC .................. *G02B 5/003* (2013.01)

(58) Field of Classification Search
CPC .................................................. G02B 3/005
See application file for complete search history.

(56) References Cited

U.S. PATENT DOCUMENTS

| | | | |
|---|---|---|---|
| 2015/0211840 A1* | 7/2015 | Katsumata | G02B 7/14 356/615 |
| 2018/0324336 A1* | 11/2018 | Wan | G02B 23/2407 |
| 2019/0011667 A1* | 1/2019 | Chang | G02B 1/041 |
| 2020/0249447 A1* | 8/2020 | Chen | G02B 13/0045 |
| 2021/0011246 A1* | 1/2021 | Fan | G02B 7/021 |
| 2021/0389510 A1* | 12/2021 | Xu | G02B 5/003 |
| 2022/0043325 A1* | 2/2022 | Huang | G02B 7/20 |

* cited by examiner

*Primary Examiner* — Christopher E Dunay
(74) *Attorney, Agent, or Firm* — Gang Yu

(57) ABSTRACT

The disclosure relates to a light blocking sheet and a lens module. The light blocking sheet includes an inner hole. A plurality of micro concave structures are regularly disposed on a periphery of the inner hole. The micro concave structure extends from the periphery of the inner hole to a direction far away from a center of the inner hole. A depth of the micro concave structure is d, an outer ring diameter of the light blocking sheet is D1, d and D1 meet $0.01 \leq d/D1 \leq 0.05$. According to the light blocking sheet of the disclosure, the micro concave structures are disposed on the periphery of the inner hole, so that stray light may be effectively suppressed.

14 Claims, 4 Drawing Sheets

LIGHT BLOCKING SHEET AND LENS MODULE

CROSS-REFERENCE TO RELATED APPLICATION(s)

The disclosure claims priority to and the benefit of Chinese Patent Application No. 202021101464.9, filed in the China National Intellectual Property Administration (CNIPA) on Jun. 15, 2020, which is incorporated herein by reference in its entirety.

TECHNICAL FIELD

The disclosure belongs to the technical field of optics, and particularly to a light blocking sheet and a lens module.

BACKGROUND

In recent years, portable electronic products have been developed rapidly, mobile phones, tablet computers and the like have particularly been integrated to the modern life, and image devices loaded on portable electronic products have also boomed. With the development of sciences and technologies, users have made increasing requirements on the quality of portable electronic devices, and thus optimizing inner elements to improve the performance and the quality based on a related art has become a motivation and goal of continuous innovation of related practitioners.

A lens module on an electronic product usually includes a camera lens and an optical component received in the camera lens. The optical component usually includes a lens, an optical filter, a spacer ring, a light blocking sheet and the like. The light blocking sheet is configured to screen unwanted stray light in the lens module. However, with the pursuit of higher imaging quality, reflection of the stray light by a surface property of an inner diameter of the light blocking sheet also gradually becomes one of factors influencing the imaging quality.

SUMMARY

Some embodiments of the disclosure are to provide a light blocking sheet and a lens module, to solve the problem of imaging quality reduction caused by reflection of stray light by an inner diameter of a light blocking sheet in the related art.

An embodiment of the disclosure provides a light blocking sheet, which includes an inner hole, wherein a plurality of micro concave structures are regularly disposed on a periphery of the inner hole, the micro concave structure extends from the periphery of the inner hole to a direction far away from a center of the inner hole, a depth of the micro concave structure is d, an outer ring diameter of the light blocking sheet is D1, d and D1 meet $0.01 \leq d/D1 \leq 0.05$.

In an embodiment, the number of the micro concave structures is N, $10 \leq N \leq 60$.

In an embodiment of the disclosure, an angle of the micro concave structure is $\theta$ and meets $20° \leq \theta \leq 160°$.

In an embodiment of the disclosure, the micro concave structure is shaped into a triangle, an arc or a trapezoid.

In an embodiment of the disclosure, a diameter of the inner hole is D2 and meets $0.15 \leq D2/D1 \leq 0.9$.

In an embodiment of the disclosure, a thickness of the light blocking sheet is H and meets $0.01 \text{ mm} \leq H \leq 0.2 \text{ mm}$.

In an embodiment of the disclosure, the micro concave structure and the light blocking sheet are integrally formed.

In an embodiment of the disclosure, the light blocking sheet is made of a metal material or a composite material.

The disclosure also provides a lens module including the abovementioned light blocking sheet, the lens module further includes a lens barrel as well as at least one lens and at least one light blocking sheet received in the lens barrel.

According to the light blocking sheet of the disclosure, the micro concave structures are disposed on the periphery of the inner hole, and $0.01 \leq d/D1 \leq 0.05$ is met. Therefore, by use of the micro concave structures in the periphery of the inner hole, a reflection path of stray light may be effectively damaged, a reflection area of the stray light may be reduced, reflection strength of the stray light may be suppressed, an image detector may be prevented from receiving unwanted light spots, and the imaging quality may further be improved.

According to the light blocking sheet of the disclosure, the number of the micro concave structures that are disposed on the periphery of the inner hole is N, and in the disclosure, meets $10 \leq N \leq 60$. Controlling the number of the micro concave structures in this range and setting the depth of the micro concave structure may achieve the best stray light suppression effect.

According to the concept of the disclosure, the micro concave structure in the disclosure may be shaped into a polygon such as a triangle, an arc and a trapezoid, and the angle of the micro concave structure is $\theta$ and meets $20° \leq \theta \leq 60°$. According to the light blocking sheet of the disclosure, the micro concave structure is formed at a certain angle, so that the reflection path of the stray light may be changed better, and the stray light suppression effect may further be improved.

According to the light blocking sheet of the disclosure, the diameter of the inner hole is D2 and meets $0.15 \leq D2/D1 \leq 0.9$.

The thickness of the light blocking sheet is H and meets $0.01 \text{ mm} \leq H \leq 0.2 \text{ mm}$. The micro concave structure and the light blocking sheet are integrally formed. The light blocking sheet is made of the metal material or the composite material. By such settings, the machining efficiency may be improved, the stability of a machining and assembling process may be ensured, and the stability of the final imaging quality may be ensured.

DETAILED DESCRIPTION OF THE EMBODIMENTS

For describing the technical solutions in implementation modes of the disclosure or the related art more clearly, the drawings required to be used in the implementation modes will be briefly introduced below. It is apparent that the drawings described below are only some implementation modes of the disclosure. Those of ordinary skill in the art may further obtain other drawings according to these drawings without creative work.

When the implementation modes of the disclosure are described, directional or positional relationships expressed by terms "longitudinal", "transverse", "above", "below", "front", "back", "left", "right", "vertical", "horizontal", "top", "bottom", "inside" and "outside" are directional or positional relationships shown in the related drawings, and are adopted not to indicate or imply that involved devices or elements are required to have specific orientations and be structured and operated with the specific orientations but only to conveniently and simply describe the disclosure. Therefore, the terms should not be understood as limits to the disclosure.

The disclosure will be described below in combination with the drawings and specific implementation modes in detail. The implementation modes may not be elaborated herein one by one, but the implementation modes of the disclosure are not thus limited to the following implementation modes.

Figure 1:
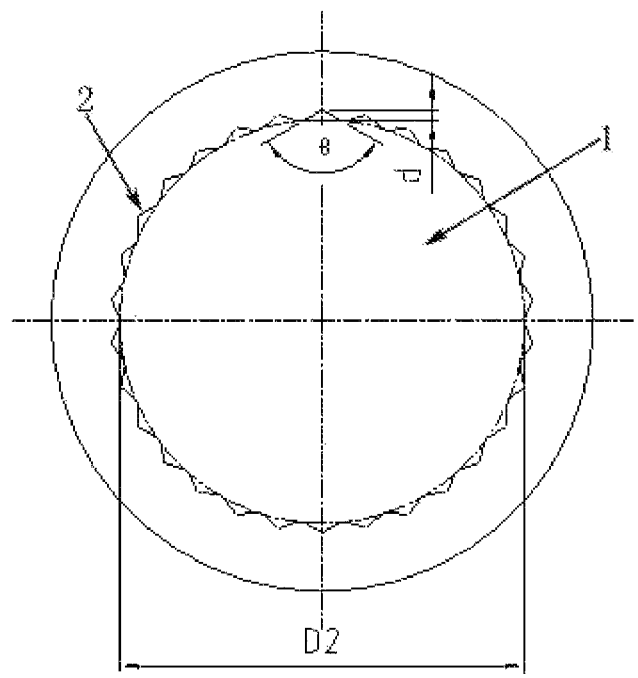
FIG. 1 schematically shows a structure diagram of a light blocking sheet according to an implementation mode of the disclosure.
Figure 2:
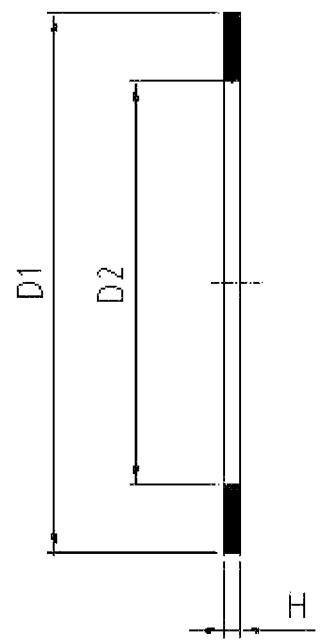
FIG. 2 schematically shows a section view of a light blocking sheet according to the disclosure.

As shown in FIG. 1 and FIG. 2, a light blocking sheet of the disclosure includes an inner hole 1, a plurality of micro concave structures 2 are regularly disposed on a periphery of the inner hole 1, the micro concave structure 2 extends from the periphery of the inner hole to a direction far away from a center of the inner hole 1, and a concave structure is disposed on a surface of the inner hole 1 of the light blocking sheet. In the disclosure, a depth of the micro concave structure 2 is d, an outer ring diameter of the light blocking sheet is D1, d and D1 meet $0.01 \leq d/D1 \leq 0.05$ is met.

According to the light blocking sheet of the disclosure, the micro concave structures 2 are disposed on the periphery of the inner hole 1, and $0.01 \leq d/D1 \leq 0.05$ is met. Therefore, by use of the micro concave structures 2 in the periphery of the inner hole 1, a reflection path of stray light may be effectively damaged, a reflection area of the stray light may be reduced, reflection strength of the stray light may be suppressed, an image detector may be prevented from receiving unwanted light spots, and the imaging quality may further be improved.

According to the light blocking sheet of the disclosure, the number of the micro concave structures 2 that are disposed on the periphery of the inner hole 1 is N, and in the disclosure, meets $10 \leq N \leq 60$. Controlling the number of the formed micro concave structures 2 in this range and setting the depth of the micro concave structure 2 may achieve the best stray light suppression effect.

According to the concept of the disclosure, the micro concave structure 2 in the disclosure may be shaped into a polygon such as a triangle, an arc and a trapezoid, and an angle of the micro concave structure 2 is $\theta$ and meets $20° \leq \theta \leq 160°$. According to the light blocking sheet of the disclosure, the micro concave structure 2 is formed at a certain angle, so that the reflection path of the stray light may be changed better, and the stray light suppression effect may further be improved.

According to the light blocking sheet of the disclosure, a diameter of the inner hole is D2 and meets $0.15 \leq D2/D1 \leq 0.9$.

A thickness of the light blocking sheet is H and meets $0.01 \text{ mm} \leq H \leq 0.2 \text{ mm}$. The micro concave structure 2 and the light blocking sheet are integrally formed. The light blocking sheet is made of a metal material or a composite material. By such settings, the machining efficiency may be improved, the stability of a machining and assembling process may be ensured, and the stability of the final imaging quality may be ensured.

Figure 3:
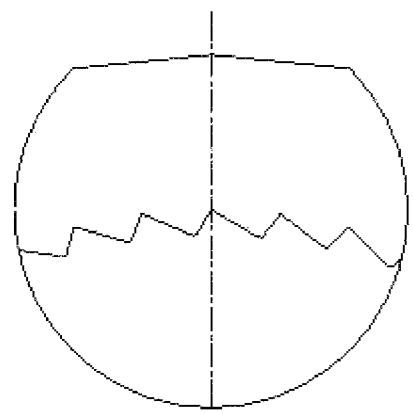
FIG. 3 schematically shows a diagram of a light blocking sheet according to an implementation mode of the disclosure.
Figure 4:
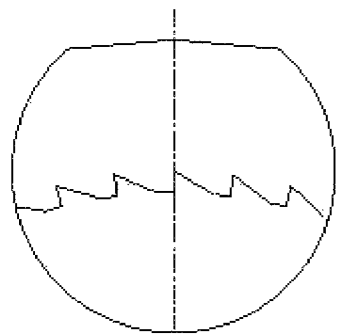
FIG. 4 schematically shows a diagram of a light blocking sheet according to a second implementation mode of the disclosure.
Figure 5:
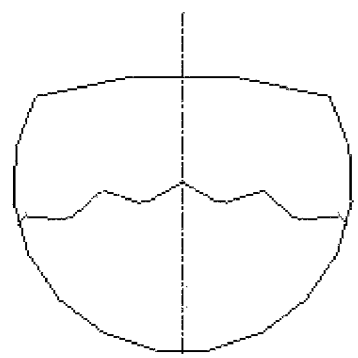
FIG. 5 schematically shows a diagram of a light blocking sheet according to a third implementation mode of the disclosure.
Figure 6:
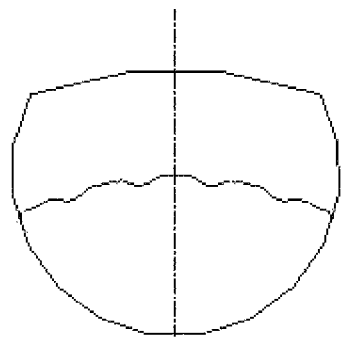
FIG. 6 schematically shows a diagram of a light blocking sheet according to a fourth implementation mode of the disclosure.
Figure 7:
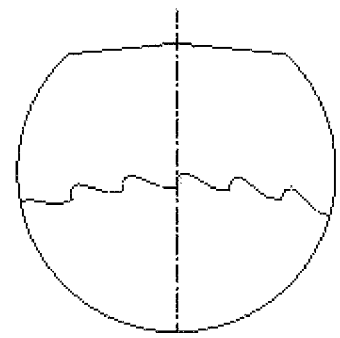
FIG. 7 schematically shows a diagram of a light blocking sheet according to a fifth implementation mode of the disclosure.
Figure 8:
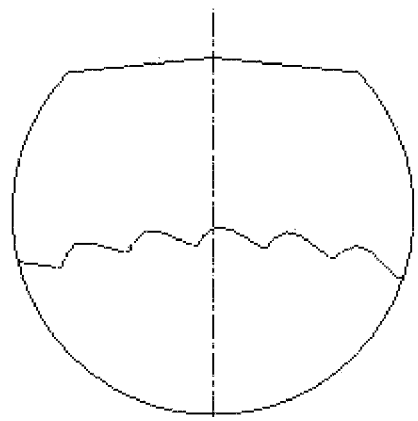
FIG. 8 schematically shows a diagram of a light blocking sheet according to a sixth implementation mode of the disclosure.
Figure 9:
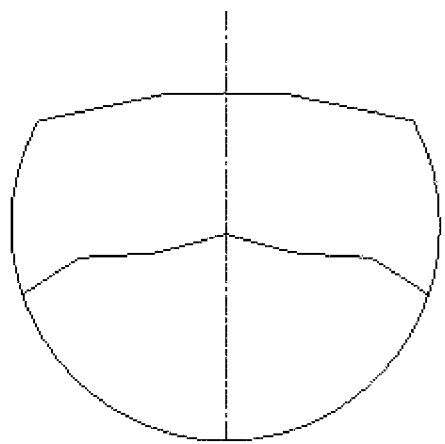
FIG. 9 schematically shows a diagram of a light blocking sheet according to a seventh implementation mode of the disclosure.

As shown in FIG. 3, according to an implementation mode of the disclosure, the micro concave structure 2 in the surface of the inner hole 1 is a triangular structure, the number is N=30, and multiple triangular micro concave structures 2 are formed at intervals in the periphery of the inner hole 1. The depth of the micro concave structure 2 is d=0.15 mm, the diameter of an outer ring surface of the light blocking sheet is D1=5.7 mm, and d/D1=0.03 is met. The angle of the micro concave structure 2 in the surface of the inner hole 1 is $\theta$=80°, the diameter of the outer ring surface of the light blocking sheet is D1, the diameter of the surface of the inner hole 1 is D2, and D2/D1=4.2/5.7=0.74 is met, so that convenience is brought to machining. The light blocking sheet is made of the composite material, and the thickness of the light blocking sheet is H=0.033 mm. Of course, according to the concept of the disclosure, there may also be other implementation modes shown in FIG. 4 to FIG. 9, which may specifically be set according to a practical requirement.

The disclosure also provides a lens module. The lens module includes a lens barrel as well as at least one lens and at least one light blocking sheet received in the lens barrel. Micro concave structures are disposed on an inner hole 1 of the light blocking sheet to improve the imaging quality of the lens module.

The above is only one implementation mode of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. An arcuate or ring-shaped light blocking sheet having an inner diameter and an outer diameter, comprising:
an inner hole defined by the inner diameter;
a plurality of micro concave structures regularly disposed along the inner diameter;
wherein the plurality of micro concave structures extend from the surface of the inner diameter toward a center of the inner hole, wherein
each of the plurality of micro concave structures have a depth d defined by the distance between the inner diameter and a peak of each of the plurality of micro concave structures closest to the center of the inner hole, wherein
each of the plurality of micro concave structures have an angle $\theta$ defined by a surface that extends from the inner diameter to the peak of each of the plurality of micro concave structures, wherein
the outer diameter of the light blocking sheet is D1, and wherein d and D1 satisfy the condition 0.01≤d/D1≤0.05, and the angle θ of the micro concave structures satisfies the condition 20°≤θ≤160°.

2. The light blocking sheet as claimed in claim 1, wherein the number of the micro concave structures is N, wherein 10≤N≤60.

3. The light blocking sheet as claimed in claim 1, wherein the micro concave structure is shaped into a triangle, an arc or a trapezoid.

4. The light blocking sheet as claimed in claim 1, wherein the inner diameter is D2 and satisfies the condition 0.15≤D2/D1≤0.9.

5. The light blocking sheet as claimed in claim 1, wherein a thickness of the light blocking sheet is H and satisfies the condition 0.01 mm≤H≤0.2 mm.

6. The light blocking sheet as claimed in claim 1, wherein the micro concave structure and the light blocking sheet are integrally formed.

7. The light blocking sheet as claimed in claim 1, wherein the light blocking sheet is made of a metal material or a composite material.

8. A lens module comprising the light blocking sheet as claimed in claim 1, comprising a lens barrel as well as at least one lens and at least one light blocking sheet received in the lens barrel.

9. The light blocking sheet as claimed in claim 8, wherein the number of the micro concave structures is N, wherein 10≤N≤60.

10. The light blocking sheet as, claimed in claim 8, wherein the micro concave structure is shaped into a triangle, an arc or a trapezoid.

11. The light blocking sheet as claimed in claim 8, w wherein the inner diameter is D2 and satisfies the condition 0.15≤D2/D1≤0.9.

12. The light blocking sheet as claimed in claim 8, wherein a thickness of the light blocking sheet is H and satisfies the condition mccts 0.01 mm≤H≤0.2 mm.

13. The light blocking sheet as claimed in claim 8, wherein the micro concave structure and the light blocking sheet are integrally formed.

14. The light blocking sheet as claimed in claim 8, wherein the light blocking sheet is made of a metal material or a composite material.

* * * * *